United States Patent Office 2,844,455
Patented July 22, 1958

2,844,455

FERTILIZER MANUFACTURE

Jay C. Harris, Dayton, Ohio, assignor to Monsanto Chemical Company, St. Louis, Mo., a corporation of Delaware No Drawing. Application September 25, 1953
Serial No. 382,457

4 Claims. (Cl. 71—40)

This invention relates to the manufacture of fertilizers, and especially to the manufacture of phosphate fertilizers. More specifically this invention relates to an improved method for manufacturing so-called superphosphate fertilizers, by utilizing a material to increase the yields and rates of the various reactions by which insoluble or unavailable phosphates are converted to soluble or available phosphates.

The terms, "available" or "soluble" phosphates, as used herein, refer to those phosphates which are soluble in either/or both water and neutral ammonium citrate solutions under the conditions of the standardized test adopted by the American Association of Official Agricultural Chemists. "Unavailable" or "insoluble" phosphates are those which are not classified as "available."

It is well known that nearly all phosphates, as they occur in nature, are in a form which is relatively useless as fertilizers because the phosphorus therein is chemically combined in the form of so-called unavailable phosphates, such as tricalcium phosphate and various apatites such as fluorapatite and hydroxyapatite. It is also well known, however, that these so-called unavailable phosphates can be readily converted to available phosphates in which the phosphorus is in a form much more readily assimilated by plant life. The most widely used methods of converting insoluble natural phosphates into so-called available phosphates involve the acidulation of the naturally occurring phosphates with an acid, such as sulfuric or phosphoric acid. The product obtained by acidulation with sulfuric acid is commonly known as "normal" superphosphate, whereas the product obtained by acidulation with phosphoric acid is known as "triple" superphosphate.

There are numerous processes for the acidulation of insoluble phosphates to produce the so-called superphosphates, which processes involve many variations in the manner in which the reactants are mixed and handled. In nearly all of such processes, the appropriately prepared (e. g., by grinding, sizing, etc.) natural phosphate is mixed with an aqueous solution of acid, with almost immediate conversion of a large proportion of the insoluble phosphate to soluble phosphate. The conversion rate falls off very rapidly, however, so that in order to achieve economical utilization of acid and natural phosphate with a profitable recovery of soluble phosphate, it is necessary to allow the mixture to continue to react for a considerably longer period of time. This longer reaction period, known as a curing period, may last as long as 10 days or two weeks—and longer curing periods are not unusual.

It is an object of the present invention to provide an improved method for producing superphosphates whereby the reaction rates during the so-called curing period are increased to such a degree that the curing time can be markedly reduced without any sacrifice in overall yield of soluble phosphate—or, alternatively, so that a much greater yield of soluble phosphate can be obtained for any given curing time.

It has now been found that the acidulation of natural or unavailable phosphates to yield available phosphates can be carried out extremely effectively in the presence of very small proportions of an alkylbenzene sulfonate anion having from about 4 to about 6, inclusive, as the average number of carbon atoms in the alkyl group thereof.

The alkylbenzene sulfonate anion to be utilized in the practice of the present invention can be supplied to the reaction mixture either as the sulfonic acid or as a salt thereof, such as an alkali metal, alkaline earth metal or ammonium salt. Examples of such suitable salts are sodium, potassium and calcium sulfonate salts. These alkylbenzene sulfonic acids and salts can be readily prepared according to any of several well-known methods, such as by the sulfonation of alkylbenzenes obtained from the alkylation of benzene with olefins of 4, 5 and/or 6 carbon atoms. The alkyl group on the benzene sulfonate can be either straight or branched chain, the latter being preferred.

A simple manner in which the alkylbenzene sulfonate anion can be utilized in the present process is by addition of the said sulfonate to the aqueous acidulating solution, e. g., sulfuric acid solution, prior to the addition of the acid to the phosphate material, e. g., phosphate rock, which is to be converted to superphosphate. The sulfonate can, however, be added directly to the solid phosphate raw material, or can be added to the mixture of phosphate and acid at or after the time of mixing, provided appropriate measures are taken to insure adequate distribution of the sulfonate throughout the reaction mass. The proportion of solfonate utilized in the practice of the present invention will generally run between about 0.001 weight percent and about 2 weight percent, and preferably between about 0.005 and about 0.5 weight percent, of sulfonate based upon the total weight of acid (100 percent) plus phosphate raw material.

The following example is presented in order to illustrate the outstanding effect which the present sulfonates have upon the rate and degree of conversion of naturally occuring insoluble phosphates to the soluble available form.

EXAMPLE

Florida land pebble phosphate rock (percent $P_2O_5$ equal 35.3 percent by weight, bone phosphate of lime (BPL) equal 77 weight percent) was ground to a degree of fineness such that 100 percent thereof passed a 60-mesh screen, 90 to 95 percent thereof passed a 100-mesh screen and 60 to 65 percent thereof passed a 200-mesh screen. Sulfuric acid (55° Baumé) at a temperature of 120° to 125° F. was added to the rock in amounts such that the weight ratio of acid (expressed as 100 percent $H_2SO_4$) to phosphate rock was equal to 0.605. The acid was added over a period of from 10 to 15 seconds and the materials were mixed for about 60 seconds. The mixture was then transferred to a fiber drum, allowed to stand for about 30 minutes, and then passed through a 6-mesh screen. The mixture was then divided into a large number of smaller samples, each of which was placed in a tightly sealed bottle and stored at a temperature of 170° F. Samples were periodically removed from storage and analyzed for total $P_2O_5$ and for insoluble $P_2O_5$.

The foregoing procedure was then duplicated several times except that sodium alkylbenzene sulfonates in varying concentrations were added to the reaction mixture in order to determine the effect of such sulfonates upon the rate and degree of conversion of insoluble $P_2O_5$ to soluble $P_2O_5$. In each case the sulfonate was added to the sulfuric acid prior to mixing with the phosphate rock.

Two different sulfonates were used, one being a commercial mixture of sodium alkylbenzene sulfonates having 5 to 6 as the average number of carbon atoms in the alkyl side chain (designated herein as sulfonate "A"), the other being a commercial mixture of sodium alkylbenzene sulfonates having alkyl side chains of about 12 carbon atoms (designated herein as sulfonate "B"). The results of these comparative tests are presented in the following tables.

Table I illustrates the marked effect which the sulfonates of the present invention have upon the rate of conversion of insoluble to soluble phosphates. From this table, it can be seen that without any sulfonate it took 25 days to reach a conversion of 97 percent, whereas the same degree of conversion was obtained in as little as 3 days with the use of the sodium salt of an alkylbenzene sulfonic acid made from a mixture of alkylbenzenes having an average of 5 to 6 carbon atoms in the alkyl side chain.

*Table I*

| Conc. of Sulfonate "A," in Wt. Percent of Final Fertilizer Product | Curing Period for Converting 97% of Total $P_2O_5$ to Available $P_2O_5$, days |
| --- | --- |
| 0.00 | 25 |
| 0.01 | 13.5 |
| 0.02 | 8 |
| 0.04 | 3 |

Table II illustrates the markedly greater conversion (of insoluble $P_2O_5$ to soluble $P_2O_5$) which can be obtained by using the alkylbenzene sulfonates of the present invention. These results are expressed in terms of percent conversion (to soluble $P_2O_5$) of that $P_2O_5$ ordinarily remaining insoluble when the present sulfonates are not utilized. Thus, Table II shows that nearly 80 percent of the $P_2O_5$ ordinarily remaining unavailable can be converted by using as little as 0.04 weight percent of the present sulfonates.

*Table II*

| Conc. of Sulfonate "A," Wt. Percent of Final Fertilizer Product | Percent Total $P_2O_5$ Converted to Available $P_2O_5$ After 12 Days | Percent Recovery of Ordinarily Unavailable $P_2O_5$ |
| --- | --- | --- |
| 0.00 | 96.1 | 0 |
| 0.01 | 96.8 | 18 |
| 0.02 | 97.7 | 41 |
| 0.04 | 99.2 | 79.5 |

Table III illustrates the marked advantage (in terms of both $P_2O_5$ conversion and time) which can be obtained with the use of as little as 0.04 weight percent of the sulfonates of the present invention. The data in this table show that over 70% of the $P_2O_5$ which remains unavailable, even after 25 days, when superphosphates are prepared without the present sulfonates can be converted to available $P_2O_5$ by the use of the present invention.

*Table III*

| Conc. of Sulfonate "A," Wt. Percent of Final Fertilizer Product | Percent of Total $P_2O_5$ Converted to Available $P_2O_5$ |
| --- | --- |
| 0.00 | 97.0% at 25 days. |
| 0.04 | 99.2% at 10 days. |

Table IV illustrates the comparative effectiveness of the alkylbenzene sulfonates of the present invention (which sulfonates contain an average of 4 to 6 carbon atoms in the alkyl group) and alkylbenzene sulfonates containing higher alkyl groups (average of 12 carbon atoms on the alkyl side chain). From the data presented in this table, it can be seen that the maximum possible conversion (to soluble $P_2O_5$) is less than 98 percent with the alkylbenzene sulfonates containing the higher alkyl groups, whereas the conversion is greater than 99 percent with the alkylbenzene sulfonates of the present invention. This represents a 175 percent greater recovery (of $P_2O_5$ remaining unavailable in the absence of an alkylbenzene sulfonate) in the case of the alkylbenzene sulfonate containing an average of 5 to 6 carbon atoms in the alkyl side chain as compared with the alkylbenzene sulfonate containing an average of 12 carbon atoms in the alkyl side chain.

*Table IV*

| Curing Time, in Days | Percent of Total $P_2O_5$ Converted to Available $P_2O_5$ | |
| --- | --- | --- |
| | Sulfonate "A" (5 to 6 Carbon Atom Alkyl Groups) | Sulfonate "B" (12 Carbon Atom Alkyl Groups) |
| | Percent | Percent |
| 2 | 96.1 | 90.8 |
| 4 | 97.6 | 94.6 |
| 6 | 98.5 | 96.9 |
| 8 | 98.9 | 97.7 |
| 10 | 99.1 | 97.8 |
| 15 | 99.2 | 97.8 |
| 20 | 99.2 | 97.8 |
| 25 | 99.2 | 97.8 |

The alkylbenzene sulfonates of the present invention are also very useful in promoting other reactions involving phosphate fertilizer materials. For example, superphosphates are often utilized in so-called mixed fertilizers containing (in addition to available phosphates) available nitrogen and/or potash. Such mixed fertilizers are generally produced by ammoniation of the superphosphate, a procedure involving reaction between superphosphates and aqueous solutions of ammonia and ammonium salts. The use of the present alkylbenzene sulfonates in connection with such ammoniation reactions is quite advantageous.

I claim:

1. In the process of producing superphosphate fertilizers by the acidulation of natural phosphates, the improvement comprising carrying out said acidulation with an acid selected from the group consisting of sulfuric acid and phosphoric acid in the presence of an alkali metal alkylbenzene sulfonate having from 4 to 6 carbon atoms in the alkyl portion thereof.

2. In the process of producing normal superphosphate by reaction between mineral phosphate rock and sulfuric acid, the improvement comprising carrying out said reaction in the presence of an alkali metal alkylbenzene sulfonate having from 4 to 6 carbon atoms in the alkyl portion thereof.

3. In the process of producing normal superphosphate by reaction between fluorapatite and sulfuric acid, the improvement comprising adding between about 0.001 weight percent and about 2 weight percent (based upon the total of acid and apatite) of a sodium alkylbenzene sulfonate containing from 4 to 6 carbon atoms in the alkyl portion thereof.

4. In the process of ammoniating superphosphate fertilizers, the improvement comprising carrying out said ammoniation in the presence of an alkali metal alkylbenzene sulfonate having from 4 to 6 carbon atoms in the alkyl portion thereof.

References Cited in the file of this patent

UNITED STATES PATENTS 1,948,520     Harvey     Feb. 27, 1934

(Other references on following page)

UNITED STATES PATENTS

| | | |
|---|---|---|
| 2,218,695 | Leatherman | Oct. 22, 1940 |
| 2,222,735 | Bancroft et al. | Nov. 26, 1940 |
| 2,223,316 | Ellis et al. | Nov. 26, 1940 |
| 2,418,203 | Stauffer | Apr. 1, 1947 |
| 2,614,917 | Zukel et al. | Oct. 21, 1952 |
| 2,616,787 | Whetstone | Nov. 4, 1952 |
| 2,624,662 | Erickson et al. | Jan. 6, 1953 |

OTHER REFERENCES

Journal of the American Society of Agronomy—Agronomic Value of Alkylation—Acid Superphosphate—Miller et al., vol. 36, published April 1944, pages 274–280.

American Potato Journal, An Evaluation of Sludge-Acid . . . Fertilizers, Brown et al., vol. 20, April 1943, pages 89–95.